M. B. DANHEISER.
AUTOMOBILE TAIL LAMP.
APPLICATION FILED SEPT. 3, 1914.
1,167,546.
Patented Jan. 11, 1916.
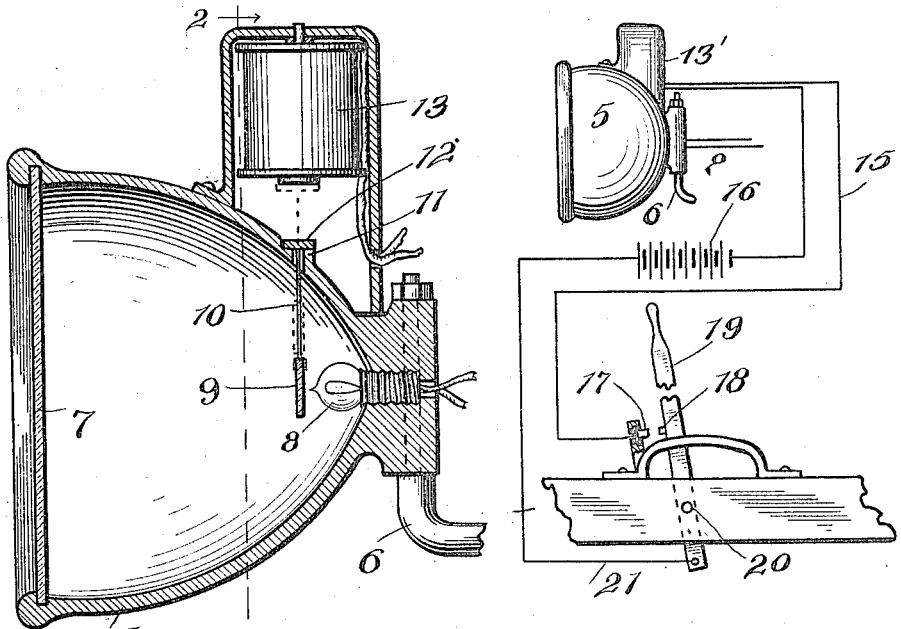
Fig. 1.
Fig. 3.
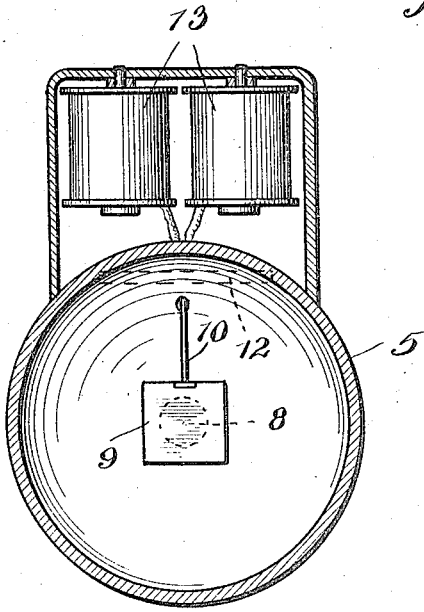
Fig. 2.
Witnesses
Wynn Johnson
Inventor
Melvin B. Danheiser
By
C. L. Parker
Attorneys

UNITED STATES PATENT OFFICE.

MELVIN B. DANHEISER, OF HUNTSVILLE, ALABAMA.

AUTOMOBILE TAIL-LAMP.

1,167,546.

Specification of Letters Patent. Patented Jan. 11, 1916.

Application filed September 3, 1914. Serial No. 859,938.

*To all whom it may concern:*

Be it known that I, MELVIN B. DANHEISER, a citizen of the United States, residing at Huntsville, in the county of Madison and State of Alabama, have invented certain new and useful Improvements in Automobile Tail-Lamps, of which the following is a specification.

My invention relates to improvements in lamps or lights for automobiles and like vehicles, and has particular reference to a tail-lamp having means for producing a colored light when the automobile is traveling forwardly and a white or bright light when the same is backing, as upon turning around, or backing into a garage or the like.

An important object of the invention is to provide means of the above mentioned character, which are simple in construction, inexpensive to manufacture, convenient in use, and reliable in operation.

A further object of the invention is to provide means to automatically cause the tail-lamp to produce a bright or white light, upon the gear shifting lever being moved to the reverse position.

A further object of the invention is to provide electrically operated means to cause the tail-lamp to produce colored and white lights.

Other objects and advantages of the invention will be apparent during the course of the following description.

In the accompanying drawings, forming a part of this specification and in which like numerals are employed to designate like parts throughout the same. Figure 1 is a central vertical longitudinal sectional view through a tail-lamp embodying my invention, Fig. 2 is a transverse sectional view taken on line 2—2 of Fig. 1, and Fig. 3 is a diagrammatic view of the tail-lamp and associated circuit or circuits.

In the drawings, wherein for the purpose of illustration is shown a preferred embodiment of my invention, the numeral 5 designates the shell or casing of a tail-lamp for an automobile, which is attached to the rear end of the automobile by means of a bracket 6 or the like. The inner surface of the shell 5 is highly polished for providing a reflector and the outer open end of the shell is covered by a lens 7, as shown. Arranged within the inner closed end of the shell 5 is a source of light 8, preferably an electric bulb, although the invention is not necessarily restricted to this type of source of light. Arranged within the inner portion of the shell 5 in advance of the source of light 8 is a preferably vertically movable or reciprocatory translucent colored plate 9, which may be red, green or the like. Connected with the upper end of the translucent colored plate 9 is a vertical rod 10, operating through a guide-sleeve 11, as shown. The rod 10 extends exteriorly of the shell 5 and has rigid connection with a preferably horizontally arranged armature 12, disposed below and in suitable proximity to an electro-magnet or electro-magnets 13. These electro-magnets are rigidly mounted within an upstanding auxiliary casing 13', which is bolted or otherwise suitably secured to the shell 5, as shown.

When the translucent colored plate 9 is in its normal lower position, the same covers the forward end of the source of light 8, whereby the rays of lights radiating from the same pass through the plate 9, and are accordingly colored. When the electro-magnet or electro-magnets 13 are energized, the same draw the armature 12 upwardly, elevating the translucent colored plate 9, whereby the white or bright rays of light from the source of light 8, pass therefrom unobstructed by the plate 9 through to the lens 7. While I have shown an electro-magnet or electro-magnets for shifting the translucent colored plate, I wish it understood that the invention is in no sense restricted to this specific type of electrically operated means for accomplishing this object, as other forms of electrically operated means may be advantageously employed, such as solenoid or solenoids, or the like.

The electro-magnet or electro-magnets 13 are connected in series with a wire 15, connected with the positive pole of a source of current 16, as shown. The wire 15 is connected with a stationary contact 17, adapted to be engaged and disengaged by a movable contact 18, carried by and having electrical connection with a gear shifting lever 19. When the contacts 17 and 18 are out of engagement, they have no electrical connection. The gear shifting lever 19 is pivoted at 20, and has connection, preferably near its lower end, with a wire 21, connected with the opposite pole of the source of current 16, as shown.

The operation of the apparatus is as follows:—When the automobile is standing still or is traveling forwardly, the gear shifting lever 19 assumes a position or positions whereby contacts 17 and 18 disengage, and the electro-magnet or magnets 13 are deenergized, the translucent colored plate 9 assuming the lower normal position, in advance of and covering the forward end of the source of light 8. To back the automobile, the lever 19 is swung toward the contact 17 for throwing the transmitting gearing into reverse. At the same time contacts 17 and 18 engage for closing a circuit to energize the electro-magnet or electro-magnets 13. In this closed circuit, current flows from the positive pole of the source of current 16, through a portion of wire 15, electro-magnets 13, a portion of wire 15, contact 17, contact 18, lever 19, and through wire 21 back to the opposite pole of the source of current. When the electro-magnet or electro-magnets 13 are energized, the armature 12 is elevated and the translucent colored plate elevated above the source of light 8, whereby the rays of light from the same pass unobstructed by this plate through the lens 7. By this means, upon the automobile backing, a bright or white light is provided, whereby the driver may clearly see behind the car, in the direction in which he is traveling.

It is to be understood that the form of my invention herewith shown and described is to be taken as a preferred example of the same and that various changes in the shape, size, and arrangement of parts may be resorted to without departing from the spirit of my invention or the scope of the subjoined claims.

Having thus described my invention, what I claim is:

1. The combination with the tail lamp of an automobile embodying a source of light, of a movable translucent colored plate normally disposed in advance of the source of light, electrically operated means to move the translucent colored plate from its normal position in advance of the source of light, a circuit connected with the electrically operated device, a gear shifting lever, and means to operate the circuit when the gear shifting lever is moved to the vehicle reverse position.

2. The combination with the tail-lamp of an automobile embodying a source of light, of a reciprocatory translucent colored plate normally disposed in advance of and in the path of travel of the rays of light radiating from the same, electrically operated means adapted when energized to shift the translucent colored plate out of the path of travel of the rays of light a circuit connected with the electrically operated means, a gear shifting lever, and means to close the circuit for energizing the electrically operated device when the gear shifting lever is moved to the reverse position.

3. In apparatus of the character described, the combination with the tail lamp of an automobile embodying a source of light, of a vertically movable translucent colored plate normally disposed in advance of the source of light to color the light, an electrically operated device arranged above the movable plate and adapted to elevate it when energized whereby the lamp will glow brightly, a circuit connected with the electrically operated device, a gear shifting lever, and means to close the circuit when the gear shifting lever is moved to the vehicle reverse position.

In testimony whereof I affix my signature in presence of two witnesses.

MELVIN B. DANHEISER.

Witnesses:
  HENRIETTA R. SCHIFFMAN,
  LEO P. COHEN.